Aug. 7, 1951     K. E. WAKEFIELD     2,563,567
VISCOSIMETER
Filed Oct. 28, 1950
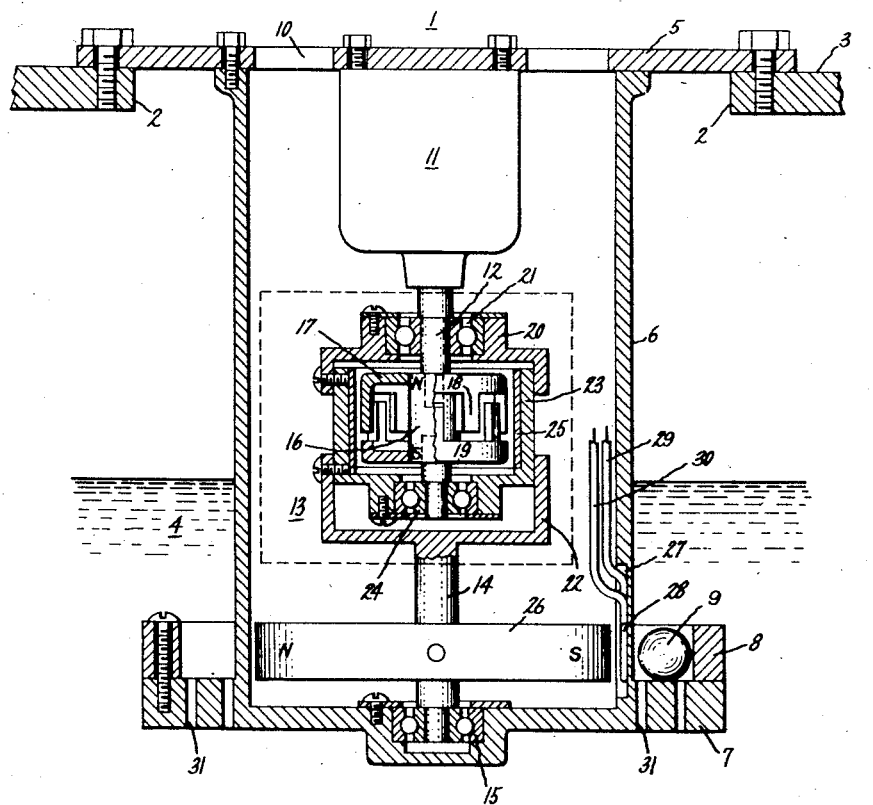
Inventor:
Kenneth E. Wakefield
by Paul A. Frank
His Attorney.

Patented Aug. 7, 1951

2,563,567

UNITED STATES PATENT OFFICE 2,563,567

VISCOSIMETER

Kenneth E. Wakefield, Schenectady, N. Y., assignor to General Electric Company, a corporation of New York Application October 28, 1950, Serial No. 192,728

2 Claims. (Cl. 73—59)

This invention relates to viscosimeters and more particularly to magnetic viscosimeters.

It is generally desirable and often necessary to measure the viscosity of a highly corrosive liquid. There may also be a high pressure differential between this liquid and the atmosphere, and as is often the case, the liquid may be at a very high temperature. For the measurement of the viscosity of a liquid situated in a container under the above conditions, viscosimeters of the prior art type utilizing a shaft seal generally prove unsatisfactory. Since the shaft seal constitutes a moving seal, it is extremely difficult to prevent the corrosive liquid from destroying the sensitive portions of the instrument. At best, the life of the seal is comparatively short necessitating frequent changes thereof and thereby increasing the cost of maintenance.

An object of this invention is to provide a device for measuring the viscosity of fluids under any or all of the heretofore mentioned conditions which obviates the use of a moving seal.

Another object of my invention is to provide a new and improved viscosimeter which has a high sensitivity throughout a wide range of viscosities.

In the attainment of the foregoing objects, I provide a hermetically sealed, corrosion resistive, cylindrically shaped container being provided with a circular race about the lower periphery thereof. A magnetic steel ball is located in the race. A permanent bar magnet lies within the container in the principal plane of the race and the transverse axis thereof coincides with the longitudinal axis of the race. A motor of known rotational speed is used to drive the ball around the race. Interposed between the magnet and the motor is a torque-transmitter which when driven at a constant speed has an output speed dependent upon the torque on the output shaft thereof. Because the torque on this shaft is dependent upon the force required to drive the ball around the race, the speed of the ball is directly dependent upon the friction force thereon. The race is submerged in the liquid under test, and by continually measuring the speed of rotation of the ball a continuous reading of the viscosity of the liquid may be obtained. One means of measuring the rotational speed of the ball which obviates the necessity of subjecting sensitive measuring apparatus to the harmful effects of the liquid is demonstrated therein. It consists of a conductive loop located in a recess in the inner surface of the wall of the container between the magnet and the race such that twice during each revolution of the magnet the flux therefrom passes through the loop. Consequently, a pulse of current is induced in the loop twice during each revolution of the magnet. Suitable means, such, for example, as a current operated counter, may be used to integrate the number of pulses occurring in a given time. More elaborate electronic equipment may, of course, be readily designed to provide a direct reading of the viscosity. It should be noted that all of the sensitive parts and all of the moving parts with the exception of the magnetic ball are protected from the liquid insuring accurate and satisfactory operation throughout extended periods of time.

For further objects and advantages and for a better understanding of this invention attention is now directed to the following description and accompanying drawing and also to the appended claims. In the single figure of the drawing there is illustrated in sectional view a viscosimeter embodying the principles of this invention.

Referring to the drawing, a viscosimeter 1 is located within a circular hole 2 provided in the upper wall 3 of a container holding a liquid 4. The lower portion of viscosimeter 1 is submerged in liquid 4 while the upper portion thereof which is in the form of a flange 5 may be hermetically sealed to upper wall 3. Those portions of viscosimeter 1 which should be isolated from the liquid under test are enclosed in a cylindrical containing member 6 which is constructed of a nonmagnetic high resistance material. Because container 6 is constructed of a solid metallic member, the chamber located within it is hermetically sealed from the liquid 4. Container 6 is provided at its lower end with a circularly shaped flange 7. In a preferred embodiment of this invention, flange 7 is merely an extension of container 6. A magnetic iron ring 8 is supported on flange 7 and fastened thereto by suitable means, such, for example, as screws as shown in the drawing or perhaps by a weld. Ring 8, together with flange 7, thereby constitutes a circular race surrounding the lower end of container 6, and a magnetic iron ball 9 is located in this race and is free, therefore, to rotate about the container. Member 5 of viscosimeter 1 is provided with a plurality of openings 10 therein which admit cooling air to the chamber as well as permit electrical connections to the parts located within the chamber.

Fastened to the central portion of member 5 and mounted in a vertical position is an electric motor 11 which rotates at a known speed. The shaft 12 of this motor drives a torque-transmitter 13 which has an output shaft 14 mounted in a suitable bearing 15 located in the lower end of container 6. As heretofore mentioned, torque-transmitter 13 is a device which when driven at a constant speed, such, for example, as by shaft 12 of motor 11, drives the output shaft 14 thereof at a speed dependent upon the torque thereon. Torque-transmitter 13 comprises a magnet assembly including a bar magnet 16 located along the longitudinal axis of shaft 12. A circular plate or disk member 17 being provided with a number of tooth-like poles 18 extending downward in a vertical direction is fastened to one pole of magnet 16. A similar magnetic disk 19 is fastened to the other pole of magnet 16 and the teeth thereof interlace with teeth 18 of plate 17. A housing unit, which includes an upper portion 20 having located therein a bearing 21 for shaft 12, has a lower member 22 which is rigidly attached to shaft 14 and a cylindrically shaped magnetic member 23 attached between the upper and lower housing members. Magnetic member 23 is substantially cylindrical in shape and has a bearing 24 in the lower portion thereof supporting the lower end of shaft 12, and a conducting ring 25 is fastened to the inner wall of it. As the magnetic assembly is rotated by shaft 12, eddy currents are induced in ring 25 which tend to rotate the entire housing member thereby rotating shaft 14. A permanent magnetic bar 26 is mounted on shaft 14 transversely thereto. Magnet 26 is positioned in the principal plane of ring 8 such that rotation of the magnet about its center by shaft 14 causes ball 9 to travel around the race. A recess 27 is provided in the wall of container 6 at a point on the perimeter thereof between magnet 26 and the race. Located in this recess is a conducting loop 28 having leads 29 and 30 connected thereto. A plurality of holes 31 are located in flange 7 to permit liquid 4 to freely circulate through the race.

In operation, the shaft of motor 11 is rotated at a known speed and the torque provided thereby is transmitted by torque-transmitter 13 to shaft 14 which rotates magnet 26. As magnet 26 rotates, magnetic ball 9 is caused to travel around the raceway. Consequently, the angular velocity of ball 9 is equal to the rotational velocity of magnet 26 as long as ball 9 is driven thereby. Of course, if magnet 26 loses control of ball 9 the device is rendered inoperative. In order to strengthen the hold of the magnet 26 on the ball 9 magnetic ring 8 is provided as a return path for the flux from magnet 26. It may be desirable, in the case where a strong magnet is not obtainable or feasible, to provide two magnetic balls rather than one, in which case one ball would follow the south pole of magnet 26 while the other ball would follow the north pole thereby providing a lower reluctance between the poles of the magnet than is provided by a device employing but one ball. Other means of providing for a return path of the flux of magnet 26 may, of course, occur to those skilled in the art.

As heretofore mentioned, the output speed of torque-transmitter 13 is dependent upon the torque on shaft 14, which is in turn dependent on the viscosity of liquid 4. Increasing the viscosity of liquid 4 increases the frictional force retarding the motion of ball 9 which increases the torque on shaft 14 which decreases the speed thereof. Consequently, the speed of rotation of shaft 14 is directly dependent upon the viscosity of liquid 4. Many ways of measuring this speed are available; however, one simple and yet accurate method is provided by loop 28 located in recess 27 of container 6. Each time a pole of magnet 26 passes loop 28 the flux linkage thereof is appreciably changed for a short instant of time which induces a high current in leads 29 and 30. By measuring the rapidity at which these pulses occur it is possible to directly measure the viscosity of liquid 1. It is also feasible to measure the rotational velocity of shaft 14 by means of a tachometer of one of many conventional constructions.

As the speed of rotation of motor 14 is increased it is found that the range throughout which this viscosimeter may be used with a high degree of accuracy is increased, and also the sensitivity of the device is increased. The sensitivity is increased because the rate of change of speed with viscosity is increased as the speed of rotation of motor 11 is increased, and the range is increased because liquid 4 may become more viscous before ball 9 is eventually stopped.

Because, without the use of moving seals, viscosimeter 1 does not have any portions located in the liquid which are sensitive to corrosive materials, high pressures, high temperatures, etc., this device has many applications. Also, because the viscosimeter with its cover plate 5 may provide a hermetically tight seal over the vat containing the liquid under test, this device is applicable for the measurement of viscosities of liquids which are at high pressures or perhaps in a vacuum, or which must be isolated from the atmosphere.

While this invention has been described by a particular embodiment thereof, it will be understood that those skilled in the art may make many changes and modifications without departing from this invention. Therefore, by the appended claims I intend to cover all such changes and modifications which fall within the true spirit and scope of this invention.

What I claim as new and desire to secure by Letters Patent of the United States is:

1. A device for measuring the viscosity of a liquid comprising a motor having a known speed, an eddy current torque-transmitter being connected to be driven by said motor, said transmitter including a hollow cylindrically shaped magnetic steel member, a hollow cylindrically shaped conducting member concentric with and in contact with the inner wall of said magnetic steel member, and a permanent magnet mounted within said conducting member and connected to be rotated by said motor, a bar magnet connected to said magnetic member in a direction transverse to the axial direction of said magnetic member, a non-magnetic high resistance hermetically sealed container in which said motor, said transmitter, and said bar magnet are located, a circular raceway surrounding a portion of said container in the plane of said bar magnet, a magnetic spherical member located in said raceway, a magnetic ring surrounding said raceway and being concentric therewith, and means indicating the velocity of said spherical member to measure the viscosity of a liquid in which said device is immersed.

2. A device for measuring the viscosity of a liquid comprising a non-magnetic cylindrically shaped container being provided with a flange at the lower end thereof, a magnetic ring having an inner diameter less than the outer diameter of said flange and greater than the outer diameter of said container located on the upper side of said flange, a motor having a known speed, a bar magnet being pivotally mounted to rotate about the center thereof within said container, the center of said magnet coinciding with the symmetrical center of said ring, a magnetic spherical member located on said flange within said ring, means driven by said motor to rotate said magnet at a speed dependent upon the torque thereon, and electric means measuring the angular speed of said magnetic member.

KENNETH E. WAKEFIELD.

REFERENCES CITED

The following references are of record in the file of this patent:

UNITED STATES PATENTS

| Number | Name | Date |
|---|---|---|
| 1,962,070 | Granet | June 5, 1934 |
| 2,142,248 | LeFevre et al. | June 3, 1939 |
| 2,360,546 | Cardwell, Jr. | Oct. 17, 1944 |
| 2,518,149 | Kearsley | Aug. 8, 1950 |